(12) United States Patent
Montgomery et al.

(10) Patent No.: US 6,450,546 B1
(45) Date of Patent: Sep. 17, 2002

(54) HIGH PRESSURE PRODUCT SWIVEL

(75) Inventors: Marshall N. Montgomery, Katy; Stephane Roy, Houston, both of TX (US)

(73) Assignee: FMC Technologies, Inc., DE (US)

( * ) Notice: Subject to any disclaimer, the term of this patent is extended or adjusted under 35 U.S.C. 154(b) by 0 days.

(21) Appl. No.: 09/915,108

(22) Filed: Jul. 25, 2001

Related U.S. Application Data (60) Provisional application No. 60/220,990, filed on Jul. 25, 2000, and provisional application No. 60/282,017, filed on Apr. 5, 2001.

(51) Int. Cl.⁷ .......................... F16L 35/00; F16L 39/00; F16L 39/04
(52) U.S. Cl. .......................... 285/95; 285/190; 285/900; 285/121.1; 285/121.6
(58) Field of Search .............................. 285/272, 121.1, 285/121.2, 121.3, 121.4, 121.5, 121.6, 190, 900, 98, 95

(56) References Cited

U.S. PATENT DOCUMENTS

| | | |
|---|---|---|
| 4,138,751 A | 2/1979 | Kentosh |
| 4,142,767 A | 3/1979 | Karl et al. |
| 4,288,106 A | 9/1981 | Foolen |
| 4,295,237 A | 10/1981 | Pomonik |
| 4,306,741 A | 12/1981 | Foolen |
| 4,320,545 A | 3/1982 | Pomonik |
| 4,405,162 A | 9/1983 | Williams |
| 4,441,522 A | 4/1984 | Griffin |
| 4,555,118 A | 11/1985 | Saliger |
| 4,579,352 A | 4/1986 | Adang |
| 4,602,806 A | 7/1986 | Saliger |
| 4,635,971 A | 1/1987 | Perratone et al. |
| 4,647,076 A | 3/1987 | Pollack et al. |
| 4,647,077 A * | 3/1987 | Ethridge et al. ............... 285/98 |
| 4,662,657 A | 5/1987 | Harvey et al. |
| 4,669,758 A | 6/1987 | Feller et al. |
| 4,741,541 A | 5/1988 | Franken |
| 4,819,966 A | 4/1989 | Gibb |
| 4,828,292 A | 5/1989 | Jansen |
| 4,925,219 A | 5/1990 | Pollack et al. |
| 5,071,171 A | 12/1991 | Perratone |
| 5,205,768 A | 4/1993 | Pollack |
| 5,242,198 A | 9/1993 | Pollack |
| 5,312,140 A | 5/1994 | Pollack |
| 5,411,298 A | 5/1995 | Pollack |
| 5,702,130 A * | 12/1997 | Erstad .......................... 285/96 |
| 5,788,288 A | 8/1998 | Jostein |
| 5,797,413 A | 8/1998 | Pollack |
| 6,053,787 A | 4/2000 | Erstad et al. |
| 6,073,777 A | 6/2000 | Jansen |

FOREIGN PATENT DOCUMENTS

| | | |
|---|---|---|
| WO | WO 98/30826 A1 | 7/1998 |
| WO | WO 98/41792 A2 | 9/1998 |
| WO | WO 99/28181 A1 | 6/1999 |
| WO | WO 99/54020 A1 | 10/1999 |
| WO | WO 00/29774 A1 | 5/2000 |

* cited by examiner

*Primary Examiner*—Eric K. Nicholson
(74) *Attorney, Agent, or Firm*—Gary L. Bush of Andrews & Kurth, Mayor, Day & Caldwell LLP (57) ABSTRACT

A production swivel with passive control of dynamic seal gap width using internal swivel pressure. The swivel includes inner and outer housings with a middle housing which transfers, component deformation due to fluid pressure from the dynamic sealing interface to the static sealing interface. The outer housing and inner housing rotate together, but the outer housing is free to expand radially outward from the middle housing with increasing fluid pressure. A floating riser spool is pressure balanced at the connection to the inner housing and to a fixed swivel stack base. Swivels are stacked with a swivel connector/spool and upper and lower mounting rings cooperatively dimensioned so that access to seals can be obtained while the swivels remained stacked without the use of overhead cranes or other lifting points than the swivel being serviced.

24 Claims, 9 Drawing Sheets

HIGH PRESSURE PRODUCT SWIVEL

CROSS REFERENCE TO RELATED APPLICATION

This Non-Provisional Application claims priority from Provisional Applications No. 60/220,990 filed on Jul. 25, 2000 and No. 60/282,017 filed on Apr. 5, 2001.

BACKGROUND OF THE INVENTION

1. Field of the Invention

This invention relates in general to equipment for transferring fluids. In particular, the invention relates to a fluid swivel joint and a swivel stack assembly adapted for transferring fluids between tankers, storage vessels and the like and one or more conduits beneath the ocean surface. The fluid of the swivel may be product such as hydrocarbons to be transferred from the seabed to a vessel or may be water or gas to be transferred from the vessel to the seabed for well stimulation.

Still more particularly, the invention relates to a sealing arrangement for a fluid swivel joint which uses the pressure of the fluid flowing through the joint to substantially prevent seal glands, and extrusion gaps in which dynamic seals are placed, from enlarging as a function of high pressure of the fluid commonly encountered on offshore loading terminals for oil and gas tankers. The invention also relates to an arrangement by which a spool is coupled between a swivel joint and a swivel stack base. The invention also concerns a procedure for disassembling and reassembling a swivel so that seals of individual swivel assemblies in a swivel stack can be replaced without the need of an overhead crane and without removing an assembly from the stack.

2. Description of the Prior Art

The offshore search for oil and gas has greatly expanded in recent years and progressed into deep rough waters such as the North Sea. To facilitate production of oil and gas from remotely located offshore fields, complex mooring systems for offshore loading terminals which serve as centralized production sites for the entire field have been developed. Flexible fluid lines called risers extend from a subsea location to the mooring site to permit the transfer of fluids between a moored vessel and a subsea location. For example, certain fluid lines may be used to convey oil and gas into the floating vessel while other fluid lines may be used to inject liquids or gases back from the vessel into subsea wells for purpose of control, well stimulation or storage.

Floating vessels can be moored to a single point mooring system, which permits the vessel to weathervane and rotate 360° about a single mooring point. To permit the vessel to rotate and move freely without causing twisting or entanglement of the various risers to which the vessel is attached, it is necessary to provide a swivel mechanism to connect the fluid lines to the mooring site. Furthermore, since a plurality of risers are involved, it is necessary that swivels be stacked in order to have the capability of accommodating multiple fluid lines or risers.

Separate swivel assemblies are stacked on top of each other with a swivel stack base fixed to a stationary frame anchored to the sea floor.

Prior high pressure product swivels have provided an inner housing and an outer housing which is rotatively supported on the inner housing by a bearing so that the outer housing is free to rotate about the inner housing. A toroidally shaped conduit chamber is formed between the two housings when the two housings are placed in registration with each other. An inlet from the inner housing communicates with the chamber, and an outlet in the outer housing communicates with the chamber. Upper and lower dynamic seals in the form of face seals or radial seals are placed in grooves or gaps between axially opposed or radially opposed surfaces of the inner and outer housings to prevent fluid from leaking past the two facing surfaces while the high pressure fluid is present in the chamber.

When high pressure is present in the inlet and passes through the toroidal chamber and out the outlet, the pressure in the chamber acts to separate the inner housing and the outer housing from each other. In other words, the inner housing is forced to contract radially inward as a consequence of the force generated by the fluid pressure acting on an effective area between the two dynamic seals; the outer housing is forced to expand radially outward by the force of the fluid pressure acting on an effective area between the upper and lower dynamic seals. Separation occurs between the facing surfaces as a result of high fluid pressure in the chamber. High pressure as used herein is meant to be at the level of 2,000 psi and above.

As the pressure of flowing product increases, the separation between the facing surfaces in which the seals are placed increases. Such separation, can be large enough due to the high product pressures, so as to prevent leak-free operation of the product swivel at the high pressures by seal extrusion failure.

Swivel component deformation has been the subject of much effort by prior developers. The prior art has considered the idea of adding more material to the swivel components so that deformation as a function of pressure—especially high pressure in the 5,000 to 10,000 psi range— will resist deflection. With high pressures, however, the swivel components, i.e., the inner and outer housings, become so large and heavy that they are disadvantageous from weight, cost, handling and size standpoints and without necessarily achieving the desired gap control.

The prior art has disclosed swivels which use exterior pressure sources to apply balancing or "buffer" fluid pressure at the dynamic seal interface. Examples of such "active" pressure compensation for dynamic seal gap control are shown in U.S. Pat. No. 4,602,806 to Saliger; U.S. Pat. No. 4,669,758 to Feller et al., U.S. Pat. No. 5,411,298 to Pollack; U.S. Pat. No. 6,053,787 to Erstad et al., and U.S. Pat. No. 4,662,657 to Harvey et al. All of these patents disclose separate anti-extrusion rings above and below the annular fluid manifold in combination with active pressure compensation.

U.S. Pat. No. 4,555,118 to Salinger discloses at FIG. 4 a free floating anti-extrusion ring placed above and below a toroidal passage between inner and outer rings. The free floating antiextrusion ring is initially displaced (i.e., at zero pressure) from the inner joint ring by a small seal extrusion gap. In operation, the internal pressure of the pressurized fluid in the toroidal passage is transmitted to the outer side of the anti-extrusion ring such that the pressure differential across the seal presses the anti-extrusion ring against the outer surface of the inner ring. In other words, the seal extrusion gap width varies as a function of internal pressure. Metal to metal contact of the anti-extrusion ring with the annular surface of the inner ring can cause friction and scoring problems during operation.

U.S. Pat. No. 4,819,966 to Gibb at FIGS. 2, 3 and 4 shows an annular ring having an annular groove which registers with the inlet of an inner housing. An annular chamber is formed outwardly in the annular ring such that upper and lower lips are created in the annular ring which faces the exterior surface of the inner housing. The lips carry dynamic seals and are forced into sealing engagement about the cylindrical surface of the inner housing above and below the inlet when pressure is in the chamber. A constant seal gap is maintained as a function of pressure by proper shaping of the chamber and the ring and the lip. A lubricating system may also be provided for injecting a controlled fluid.

Another problem inherent in high pressure production swivels is that at extremely high pressures, e.g., 5000 psi and above, a fixed connection of the inlet spool to the inner housing can cause pipe loads and a seal stab connection can cause forces to be applied to the inner housing as a result of the pressure acting at the connection. For example, U.S. Pat. No. 6,053,787 at FIG. 2B shows a spool connected to an inner housing, and although sealed with respect to the inner housing, high pressure in the spool causes forces to be transmitted to the housing as a result of the pressure. U.S. Pat. No. 4,662,657 shows at FIG. 1 a pressure balanced connection of a spool at a swivel stack base. Such connection acts as an expansion joint in that the connection is pressure balanced and does not transmit force. This allows the spool to grow freely when heated, thus eliminating thermal loading due to pipe expansion. The '657 patent shows a fixed connection to the inner housing of the swivel to which it is connected in the swivel stack.

3. Identification of Objects of the Invention

A primary object of the invention is to provide a fluid swivel arrangement that is capable of flowing high pressure product through it without danger of product leaking past dynamic seal grooves formed between the inner and outer housings.

Another object of the invention is to provide a swivel arrangement with high pressure fluid in the conduit chamber, such that radial expansion of the outer housing and radial contraction of the inner housing has little or no effect on the bearing between the inner and outer housings.

Another object of the invention is to provide a high pressure swivel such that radial expansion of the outer housing or radial contraction of the inner housing has substantially no effect on the extrusion gap of dynamic seals between the inner and outer housings.

Another object of the invention is to provide a sealed fluid joint for a fluid swivel in which a middle housing ring is positioned between a conventional inner housing and outer housing ring with dynamic product seals between the inner housing and the middle housing ring and static product seals between the middle and outer housing ring.

Another object of the invention is to provide a sealed fluid joint with an internal design that minimizes dynamic extrusion gap growth as a function of internal fluid pressure by transferring component deformation from the dynamic seal gap to the static seal gap while taking advantage of the fact that static product seals can tolerate larger extrusion gaps without failure.

Another object of the invention is to provide a sealed fluid joint with an inner housing and a coaxial middle and outer housing rings which provide two concentric toroidal chambers, one formed between the inner housing ring and the middle housing ring, the second between the middle housing ring and the outer housing ring where both toroidal chambers are fluidly in communication with each other through holes in the middle housing ring thereby allowing the pressurized product fluid to flow from the inlet to the outlet.

Another object of the invention is to provide a sealed fluid joint with an inner housing and coaxial middle and outer housing rings with dynamic product seals placed between the inner housing and the middle housing ring and static product seals placed between the middle and outer housing rings with the dynamic extrusion gap width being controlled as a function of pressure acting on the difference of effective areas defined by the static seals and the dynamic seals, the shape of a toroidal chamber between the inner housing and the middle housing ring and the shape of a toroidal chamber between the middle and outer housing rings.

Another object of the invention is to provide a sealed fluid joint with an inner housing and coaxial middle and outer housing rings with dynamic seals placed in glands between the inner housing and middle housing rings, where passive control over the dynamic seal extrusion gap is obtained from the internal fluid pressure causing the middle housing ring to contract radially at the same rate as a function of pressure as does the inner housing.

Another object of the invention is to provide a sealed fluid joint with an inner housing and middle and outer housing rings where the middle and outer housing rings are arranged and designed to rotate together but can move radially away from each other as a function of increasing internal fluid pressure.

Another object of the invention is to provide a swivel stack arrangement with a swivel stack base and swivel where a floating spool provides a pressure balanced connection at the inner housing and at the swivel stack base.

SUMMARY OF THE INVENTION

The objects identified above, as well as other advantages and features of the invention, are incorporated in a sealed fluid joint for a rotatable fluid swivel in which a pressure balanced middle housing ring is mounted between an inner housing and outer housing ring. Two bearing plates bolted on the top and bottom of the middle housing capture and support the outer housing ring around the middle housing ring. The sub-assembly of the bearing plates, middle housing ring and outer housing ring is free to rotate around the inner housing.

Pressure balance is achieved by providing an inner annulus chamber or cavity between the inner housing and middle housing ring and an outer annulus chamber or cavity between the middle and outer housing rings. Holes or passages through the middle housing ring fluidly connect the inner and outer chambers. Dynamic seals are placed in seal glands between the inner housing and the middle housing ring. Static seals are placed in seal glands between the middle and outer housing rings. Seals are matched in pairs and symmetrically located above and below a swivel horizontal line of symmetry. The seal glands may be radially or axially oriented. In other words, face seals may be placed in glands which are parallel with the swivel assembly horizontal line of symmetry. Radial seals may be placed in glands which are parallel with the inner housing longitudinal axis.

The sealed fluid joint arrangement transfers component deformation due to product fluid pressure from the dynamic seal interface to the static seal interface by exposing fluid product pressure to a smaller effective area at the dynamic seals on the inner side of the middle housing ring than an effective area at the static seals on the outer side of the middle housing ring. The counter forces generated by the product fluid pressure over two different effective areas on the middle housing ring deforms the middle housing ring radially in a predetermined direction and amount as a function of increasing pressure. Control of radial deformation of the middle housing ring is passive as it relates to a geometrical arrangement of dynamic and static seals on both sides of the middle housing ring and is proportional to the product fluid pressure.

The objective of the arrangement is to maintain the dynamic extrusion gap at its initial or zero pressure width even at high internal fluid pressures. Because dynamic seals are more likely to fail than are static seals when subject to pressure, maintaining a small dynamic extrusion gap minimizes the likelihood of product leaking past the dynamic seals. Maintaining the dynamic extrusion gap at its initial width using this arrangement also eliminates the effect of radial deformation on the bearing performance, because bearing plates are provided which are bolted to the middle housing ring and subject to the same effect.

The transfer of component deformation from dynamic seal extrusion gaps to static seal extrusion gaps is provided with a coupling arrangement between the outer housing ring and the middle housing ring so that the outer and middle housing rings are capable of rotating together about the inner housing and with the outer and middle housings rings being free to deflect radially with respect to each other as a function of internal fluid pressure in the joint. The coupling insures that the outer housing ring expands concentrically with respect to the middle housing ring even when external side loads are applied.

According to another aspect of the invention, a swivel stack is provided with a fixed swivel stack base and one or more swivels having their inner housings each fixed to each other and to the fixed stack base. Each swivel has an inlet at its inner housing connected to an inlet of the stack base by means of a floating spool with a pressure balanced connection at both the swivel and at the base. Such pressure balancing of the spool at the base and the swivel inner housing prevents high pressure fluid induced forces and thermal induced forces from being transferred from the spool to the swivel as would arise with a simple stab seal connection. Providing a floating spool with a pressure balance connection results in a coupling where substantially no pipe loads are transferred to the swivel as would occur with a rigid pipe connection. Furthermore, providing a floating spool minimizes the size of the inner housing, because it has a small profile when compared to bolted flange. A small spool size minimizes the total weight of the swivel stack. The floating spool also reduces the loads on the swivel stack base and the size of the swivel itself.

According to another aspect of the invention, a swivel stack is provided with a connector positioned coaxially with the inner housings of upper and lower swivels. The connector is secured between a bottom surface of an upper swivel and a top surface of a lower swivel. Each swivel has upper and lower bearing plates which are positioned respectively adjacent upper and lower surfaces of the inner housing and a coaxial middle housing of each swivel. The bearing plates, secured to the middle housing ring, have an internal radius as measured from the central longitudinal axis. The connector has an external radius, as measured from the central longitudinal axis which is less than the internal radius of the lower and upper bearing plates.

BRIEF DESCRIPTION OF THE DRAWINGS

The objects, advantages, and features of the invention will become more apparent by reference to the drawings which are appended hereto and wherein like reference numbers indicate like parts and wherein an illustrative embodiment of the invention is shown, of which.

DESCRIPTION OF THE PREFERRED EMBODIMENTS OF THE INVENTION

Figure 1:
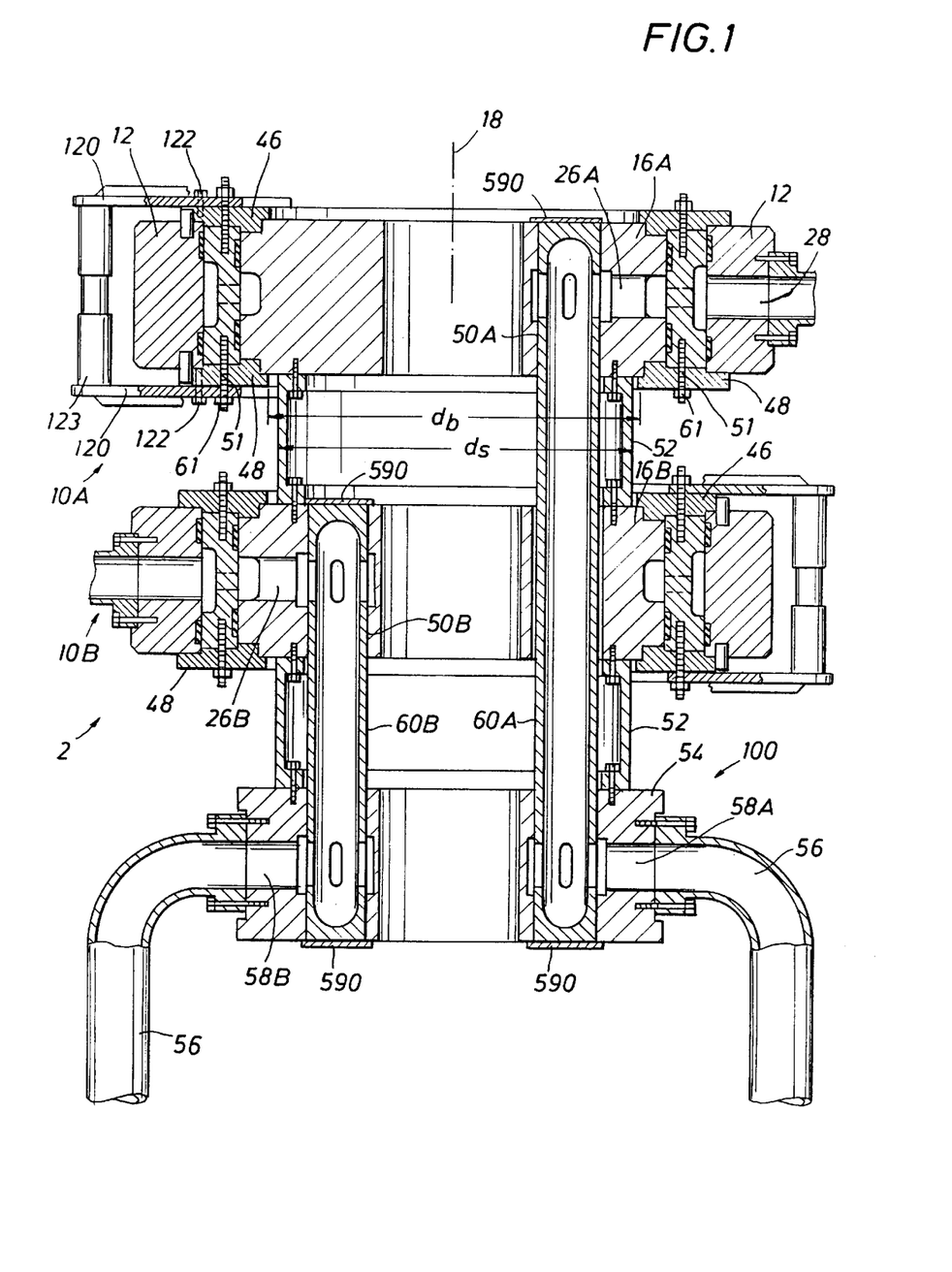
FIG. 1 is a cross section of an illustrative swivel stack according to the invention with two swivels stacked on a swivel stack base with one inlet of the base fluidly coupled to an outlet of one swivel and a second inlet of the base fluidly coupled to an outlet of a second swivel.
Figure 2:
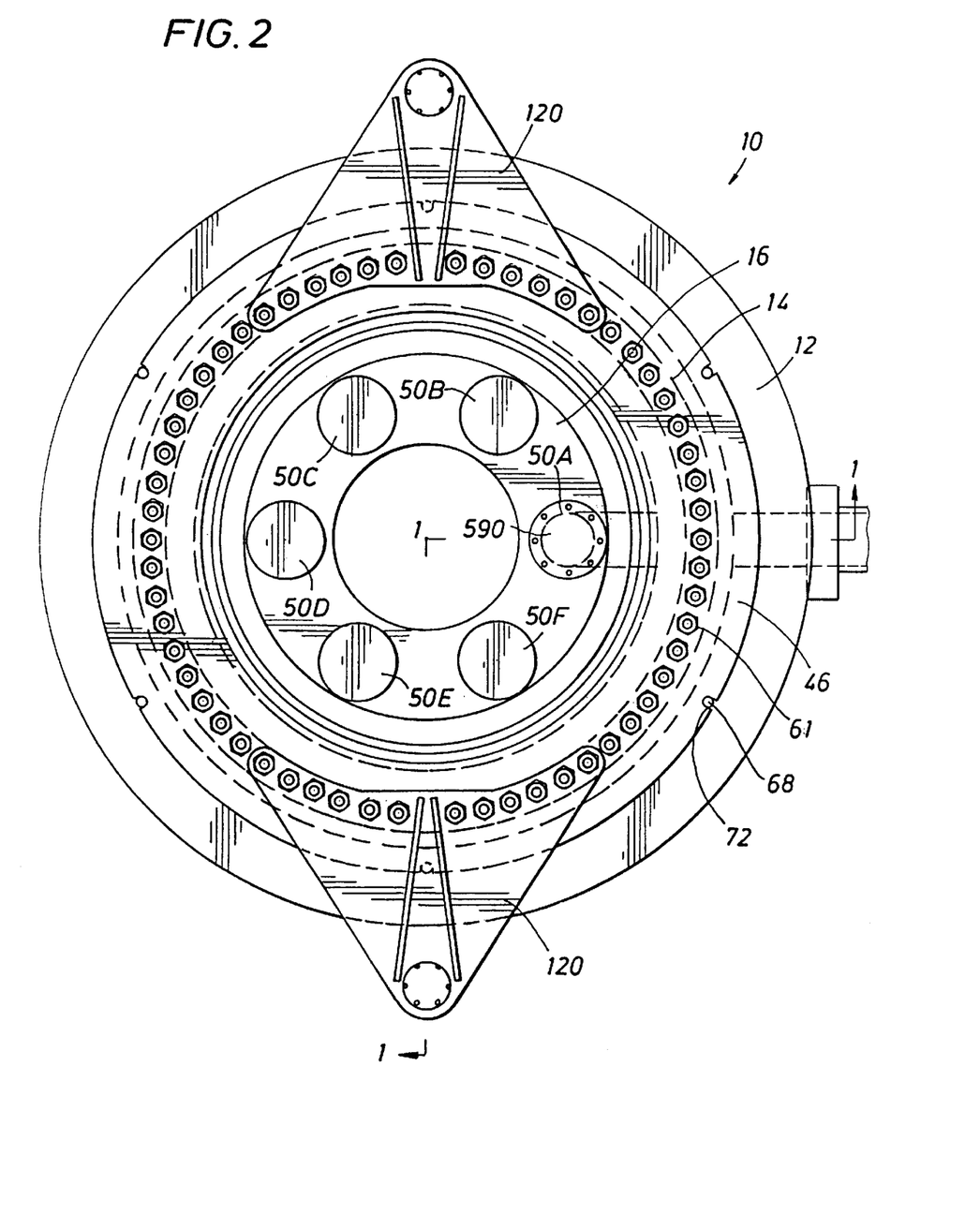
FIG. 2 is a top view of the swivel stack of FIG. 1 with section lines 1—1 indicating the cross section of the top swivel of the stack of FIG. 1.

FIG. 1 illustrates a stack of swivels stacked on top of each other according to the invention. Two swivels, 10A, 10B (also called sealed fluid joints herein) are shown stacked atop fixed swivel base 100. Only two swivels are shown for illustrative purposes in FIG. 1, but as FIG. 2 shows, six inner housing bores 50A, 50B, . . . 50F in each inner housing 16A . . . 16B accommodate six swivels stacked on top of each other. Of course, more or less than six swivels can be stacked. As shown in FIG. 1, each inner housing 16 (e.g., 16A of the top swivel, 16B of the bottom swivel) is secured to another inner housing by means of a respective swivel connector 52. The bottom most swivel in the stack (e.g., as shown in FIG. 1) connects its inner housing 16B to a base housing 54 of swivel stack base 100 through a swivel connector 52.

The swivel stack base 100 is fixed to a substantially geostationary point (not shown) of an offshore mooring terminal. For a turret moored system, for example, the base housing 54 may be fixed to the top of the turret. First and second fixed spools 56, arranged and designed to carry high pressure fluids, enter base inlets 58A, 58B of base housing 54. Of course, other spools are provided about the circumference of the base to provide fluid communication to other swivels in a stack. A floating spool 60A provides fluid communication between base inlet 58A and inner housing inlet 26A of swivel 10A. Floating spool 60B provides fluid communication between inlet 58B and inner housing inlet 26B of swivel 10B. The bolted retaining flanges 590 insure that the floating spools 60A, 60B remain with their respective bores.

Figure 3:
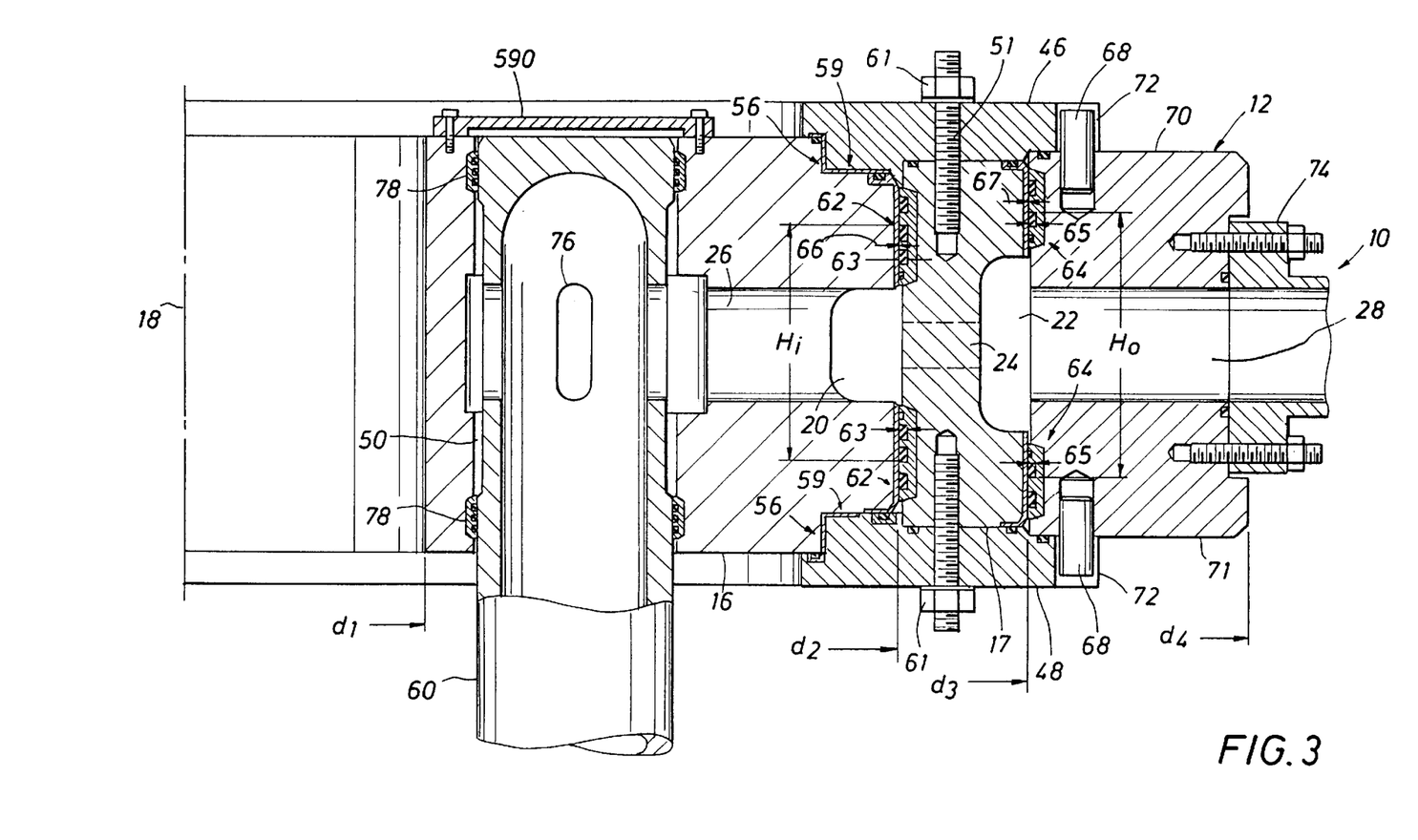
FIG. 3 is an enlarged partial cross section of the top swivel of FIG. 1.
Figure 4A:
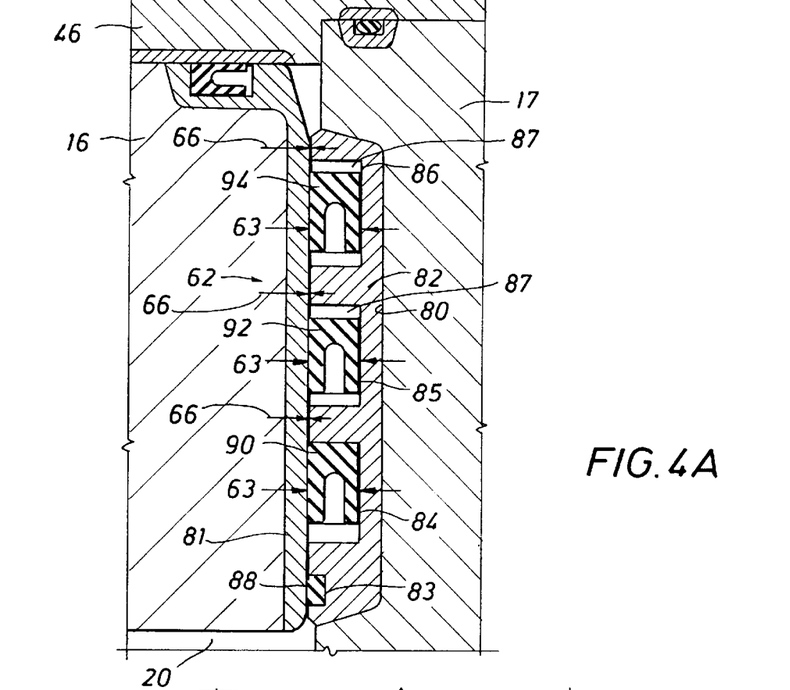
FIGS. 4A and 4B are enlarged views of dynamic seal glands and dynamic seals and associated seals therein and static seal glands and static seals and associated seals therein.

FIG. 3 shows a preferred embodiment of the sealed fluid joint 10 of the invention. The sealed fluid joint 10 is a toroidal swivel design which includes a middle housing ring 17 between an inner housing 16 and an outer housing ring 12 all of which are coaxially positioned about a common longitudinal (vertical) axis 18. Component deformation, e.g., contraction of the inner housing 16 is transferred from the dynamic sealing interface 63 (see enlargement as shown in FIG. 4A), to the static sealing interface 65 (see enlargement of FIG. 4B). The objective of the invention is to maintain the dynamic extrusion gap 66 (see FIGS. 4A and 4C) at its initial value (i.e., the gap that exists at zero pressure of the product fluid in the swivel) even as the product pressure in the swivel increases greatly (e.g., to pressures greater than 5,000 psi). Maintaining the initial dynamic extrusion gap width 66 of the dynamic sealing interface of FIGS. 3, 4A, 4C substantially constant as a function of product fluid pressure is advantageous, because dynamic seals are more likely to fail than are static seals when subjected to a large extrusion gap.

The swivel 10 of FIG. 3 includes an inner housing 16, a middle housing ring 17 and an outer housing ring 12. Top and bottom bearing plates 46, 48 are secured to middle housing ring 17 by means of threaded studs 51 and nuts 61. Upper and lower bronze coated planar thrust bearing surfaces on bearing plates 46, 48 and the inner housing 16 provide upper and lower thrust bearings 59. Upper and lower bronze coated radial bearing surfaces on the bearing plates 46, 48 and the inner housing 16 provide upper and lower radial bearings 56. The middle housing ring 17 and the bearing plates 46, 48 are secured together by studs 51 and rotate about the stationary inner housing 16. A close radial fit restrains excessive radial offset of the bearing plates 46, 48 with respect to the inner housing 16. Such close radial fit minimizes the middle housing ring from deviating from its true position from the common longitudinal axis 18, and prevents a radial offset of the dynamic seal interface and aids in maintaining the seal extrusion gaps 66 constant by preserving the coaxiality of the middle housing ring 17 with the inner housing ring 16.

Upper and lower dynamic product seals are placed in the arrangement 62 as shown in FIG. 4A and are placed in upper and lower seal glands 63 between the inner housing 16 and the middle housing ring 17. The static product seals are placed in the arrangement 64 of FIG. 4B and are placed in upper and lower seal glands 65 between the middle housing ring 17 and the outer housing ring 12.

The bearing plates 46, 48 support but do not clamp the outer housing 12. The outer housing ring 12 can freely expand radially but rotates with the middle housing ring 17, because press fitted pins 68 (see FIG. 3) in the outer housing ring top and bottom surfaces 70, 71 register with open slots 72 machined in the bearing plates 46, 48. The number of pins 68 and the distribution around the top and bottom surfaces 70, 71 insure the outer housing ring 12 expands concentrically in respect with the middle housing ring 17, even when side loads are applied at the outlet connection 74. The open slots 72 with pins 68 in them are seen also in the top view of FIG. 2.

The inlet 26 in inner housing 16 and outlet 28 in outer housing ring 12 are sized to accommodate the inside area of spool 60 and an outlet pipe secured to outer housing outlet 28. A flanged connection 74 at the outlet 28 can be made to such outlet pipe. The inlet spool 60 is floating within the inner housing 16 with openings 76 providing a flow path for product fluid flow in or out of the swivel 10. The openings 76 are trapped or pressure balanced between upper and lower sets of three static seals 78 which seal the inlet 26 with respect to the product fluid pressure in the spool. More than three or less than three seals 78 could be provided. Because the pressure is the same above and below the inlet 26, and because the upper and lower seals 78 are of the same radial dimension, there is substantially no pressure induced force or thermal expansion induced force transmitted at the connection between the inner housing 16 and the swivel connector 52.

As shown in FIG. 1, spool 60A is similarly coupled to the inlet 58A of stack base 54 by a floating connection. Retaining plates 590 on top of inner housing 16 and bottom of swivel stack base 54 insure that the floating spool 60A stays trapped within the swivel stack. In FIG. 3, the retaining plate 590 is shown with a gap over the spool 60 to allow for thermal expansion. Allowing the floating spool to expand freely avoids inducing forces at the connection between the inner housing 16 and the swivel connector 52. Referring again to the swivel stack of FIG. 1, the floating spool 60 provides a pressure balanced connection that reduces the envelop of the swivel connector 52 in comparison to the space requirement of a bolted flange. As a consequence, this arrangement reduces the size of the inner housing 16, the middle housing ring 17 and outer housing ring 12 and the swivel connector 52. The pressure balanced pipe spool connection considerably reduces the loads as compared to a flange connection on the inner housings 16A, 16B (and the swivel connectors 52 transmitted to the swivel stack base 54 and the overall weight of swivel assemblies 10A, 10B) which help in reducing the size of the swivel stack assembly 100.

The flow path through the swivel 10 includes an internal toroidal cavity or "chamber" or "manifold" 20 (see FIG. 3) formed between the inner housing 16 and the middle housing ring 17. The cavity 20 is sized so as to carry the same volume of fluid that enters via inlet 26. An external toroidal cavity 22 is formed between the middle housing ring 17 and the outer housing ring 12. The external toroidal cavity 22 is fluidly connected to the internal toroidal cavity 20 by a plurality of radial flow passages 24. The external toroidal cavity 22 communicates with outlet 28. The preferred placement of the dynamic seal arrangement 62 is illustrated in FIG. 4A in the seal glands 63 between the facing cylindrical surfaces of inner housing 16 and middle housing ring 17. The exterior facing surface of the inner housing 16 includes a band 81 of non-corrosive alloy such as INCONEL. The interior surface of the middle housing ring 17 has an annular pocket 80 machined in it which is then later filled with a non-corrosive alloy such as INCONEL with four grooves 83, 84, 85, 86 machined therein for placement of seals. An upper and lower excluder seal 88 is placed in seal groove 83 at the entrance of seal gland 63 from the toroidal cavity 20. Proceeding axially outwardly from the toroidal cavity 20, upper and lower grease barrier seals 90, upper and lower primary product seals 92 and upper and lower secondary product seals 94 are placed in grooves 83, 84, 85 and 86.

The excluder seals 88 and grease barrier seals 90 are completely exposed to the swivel internal pressure from the inner toroidal cavity 20. Substantially no differential pressure is provided by the excluder and grease barrier seals. During normal operation, both upper and lower primary product seals 92 contain the swivel internal operating pressure. A pressure gradient is present across those seals from internal operating pressure to atmospheric pressure.

When a primary seal 92 fails to adequately contain the swivel internal pressure, the pressure is transferred to the secondary seal 94. At this point no pressure gradient is provided across the primary seal 92, and the secondary seal 94 is exposed to and contains the swivel internal operating pressure with a pressure gradient across the secondary seal from operating pressure to atmospheric pressure.

Figure 4B:
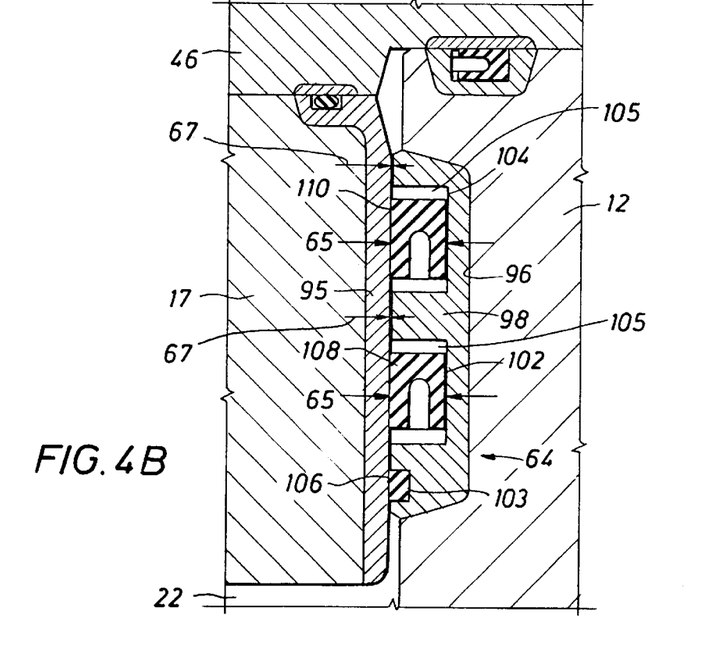

A similar arrangement is provided for the static seal interface as shown in FIG. 4B. A band of INCONEL or other non-corrosive alloy 98 is placed in an annular pocket 96 in outer housing ring 12 facing a band 95 of INCONEL or other non-corrosive alloy formed on an outwardly facing surface of middle housing ring 17. Excluder, primary and secondary static seals 106, 108, and 110 are placed in grooves 102, 103, 104. The excluder seals 106 are completely exposed to swivel internal pressure, but substantially no differential pressure is developed across those seals. During normal operation, upper and lower static primary product seals 108 contain the swivel internal operating pressure at external cavity 22 with a pressure gradient across those seals from operating pressure to atmospheric pressure. The secondary seals 110 take up the pressure gradient when the primary seal fails.

The size and shape of internal toroidal cavity 20, the diameter $d_2$ which defines dynamic interface width and the height $H_i$ between the upper and lower primary dynamic seals 92 determine the magnitude of the effective area on which fluid pressure acts at the dynamic interface. When the product fluid pressure acts on this effective area, the magnitude of the inward force generated on the inner housing 16 and the outward force on the middle housing ring 17 are determined. In a similar way, the size and shape of toroidal cavity 22, the diameter $d_3$ which defines the static interface and the height $H_0$ between the upper and lower primary static seals 108 determine the magnitude of the effective area on which fluid product pressure acts at the static interface. When the product fluid pressure acts on this second effective area, the magnitude of the inward force generated on the middle housing ring 17 and the outward force on the outer housing ring 12 are determined.

In a preferred embodiment, each swivel of the swivel stack 10 is arranged and designed such that as a function of product fluid pressure from zero pressure to operating pressures, the inward force on the middle housing ring 17 is greater than the outward force on the middle housing ring 17 to cause the middle housing ring 17 to move inwardly at the same rate as the inner housing 16 deflects inwardly as a function of increasing product fluid pressure. The outer housing ring 12 freely deflects outwardly from the middle housing ring 17 in the same way that increasing product pressure acts on an internal pressure vessel. Such outer housing ring 12 deflection is accommodated by static seals 108 which can tolerate a large extrusion gap 67 without failure. The swivel of FIG. 3 may also be designed such that the middle housing ring 17 moves at a different rate from that of the inner housing 16 such that the extrusion gap 66 for the dynamic seals 92 varies as a function of product fluid pressure from zero pressure to operating pressures. For example, under certain circumstances it may be desired that the separation between the inner housing 16 and the middle housing ring 17 be less at operating pressure than at zero pressure.

A design method to produce a predetermined gap width as a function of pressure follows. The methodology described below shows how the deformation pattern of the various related parts evolves and what are the geometrical parameters necessary to achieve the transfer of dynamic extrusion gap growth to the static seal interface. The result provides an initial solution that can later be optimized using finite element analysis.

Sizing of the parts illustrated in FIGS. 1, 2 and 3 begins with information as to spool 60 flow size and the amount of inner housing 16 deformation. When pressurized product flows via inlet 26, it splits into two paths in inner annular toroidal passage or "cavity" 20. The inner cavity 20 cross section is sized at approximately 60% of the inlet 26 flow area. The flow area 26 is substantially the same section as the spool 60. Assuming a rectangular shape with appropriate radii for the inner cavity 20, and with knowledge of the cross-sectional area desired, the height of the cross section of the inner cavity 20 is set equal to the diameter of the inlet 26. Thus, the radial depth of the inner cavity is calculated from the relationship A=h×d, where A and h are known. From such dimension, the scraper seals 88, the grease barrier seals 90, the primary seals 92, and the secondary seals 94 and the seal glands 63, 83 for same are laid out at the inner housing 16—middle housing ring 17 interface. The seals are distributed symmetrically above and below the meridional line of symmetry of the swivel 10.

The sizing of the middle housing ring 17 is determined next. The holes or passages 24 from the inner toroidal cavity 20 pass through middle housing ring 17 to the outer toroidal cavity 22. The holes 24 are evenly distributed on the meridional line of symmetry. The holes 24 are preferably sized to present a total hole 24 area equal to about four times the area of inlet 26 (or the inlet spool 60).

According to one aspect of the invention, the fluid swivel joint 10 of FIG. 3 is arranged and designed to keep the dynamic seal gland 63 and the extrusion gap 66 (see FIGS. 4A, 4C) formed at the interface between the inner housing 16 and the middle housing ring 17 constant (or any predetermined seal gap width as a function of pressure) over the fluid pressure range to be expected.

The next step is to determine the inner housing 16 radial contraction or deformation as a function of increasing pressure. The inner housing 16 is subject to external pressure (i.e., effective area, characterized by the height $H_i$ between the upper and lower primary seals 92 on diameter $d_2$) which results in radial contraction. Using equations for thick wall cylinders, the radial contraction is a function of pressure, internal diameter, external diameter, the height over which pressure acts on the inner housing and the over-all height of the inner housing 16. Such equations are found in Engineering and Pressure Vessel reference books. See for example *Roark's Formulas for Stress and Strains*, $6^{th}$ Edition by Warren C. Young, McGraw-Hill, Inc., Chapter 12.6—Thick Shell of Revolution, pp. 636–641, which is incorporated by reference herein. The functional relationship is not linear for the geometrical parameters, but once the geometry is specified, the radial contraction varies linearly with pressure. The radial contraction, therefore can be written as a linear function of pressure p:

$$D_i = F(d_1, d_2, H_i, L) \times p \tag{1}$$

where

F=a cylinder equation functional relationship
$d_1$=predetermined internal housing inner diameter
$d_2$=predetermined internal housing outer diameter
$H_i$=effective height between dynamic seals 92
L=height of inner housing
p=internal pressure of swivel
Equation (1) can be written as $$D_i = K_I \times p \tag{1a}$$

where $K_I$ is a function of predetermined geometrical factors as indicated above.

The middle housing ring 17 experiences an outward force from the pressurized fluid in the inner cavity 20 acting between the upper and lower primary dynamic seals 92 and an inward force from the pressurized fluid (at substantially the same pressure) in the cavity 22 acting between the primary static seals 108. Thus there are two different and opposing patterns of radial deformation, $D_{mi}$ and $D_{mo}$, the resultant of which depends on the middle housing ring 17 geometry and the respective effective internal and external areas on which pressure acts on the middle housing ring 17.

Using thick wall cylinder equations, the radial expansion created by the internal pressure on the effective height between the primary dynamic seals 92 on the middle housing ring 17 inside diameter is expressed as, $$D_{mi} = G(d_2, d_3, H_i, L) \times p \qquad (2)$$

where
- G=a cylinder equation functional relationship
- $d_2$=predetermined middle housing ring inner diameter
- $d_3$=middle housing ring outer diameter to be determined
- $H_i$=effective height between dynamic seals 92
- L=height of middle housing ring
- p=swivel internal pressure Equation (2) can be written as $$D_{mi} = K_{mi} \times p \qquad (2a)$$

where $K_{mi}$ is a function of predetermined geometrical factors as indicated above.

Again using thick wall cylinder equations, the radial contraction created by the external pressure on the effective height $H_O$ between the primary static seals 108 on the middle housing ring 17 outer diameter is expressed as, $$D_{mo} = H(d_2, d_3, H_O) \times p \qquad (3)$$

where
- H=a cylinder equation functional relationship
- $d_2$=predetermined middle housing ring inner diameter
- $d_3$=middle housing ring 17 outer diameter to be determined
- $H_O$=effective height between static seals 108 to be determined
- L=height of middle housing ring
- p=internal swivel pressure Equation (3) can be written as $$D_{mo} = K_{mo} \times p \qquad (3a)$$

where $K_{mo}$ is a function of predetermined geometrical factors as indicated above.

The net radial deformation resulting from applying substantially the identical pressure on both the inner and outer effective areas of the middle housing ring 17 is the summation of radial expansion and radial contraction as long as the stress generated in the middle housing remains in the elastic domain of the material of the housing ring 17. As a result, the net movement inward of the middle housing ring 17 is $$D_{m\ net} = D_{mo} - D_{mi} \qquad (4)$$

or $$D_{m\ net} = (K_{mo} - K_{mi}) \times p \qquad (5)$$

Once the geometrical parameters are established at the dynamic interface 62, the dimension $H_O$ between the primary static seal 108 at the static interface 64 and the middle housing ring 17 outside diameter $d_3$ are sized to force the resultant radial deformation of the middle housing ring 17 to be at predetermined relationship with respect to the inner housing contraction $D_i$ of equation 1(a). Preferably that relationship is one of equality, $$D_{m\ net} = (K_{mo} - K_{mi}) \times P = D_i = K_I \times P$$

or $$(K_{mo} - K_{mi}) = K_I \qquad (6)$$

Of course, if $D_{m\ net}$ is predetermined to be larger or smaller than $D_i$, then the difference $K_{mo} - K_{mi}$ is adjusted accordingly by adjusting the geometrical parameters that affect $K_{mo}$ or $K_{mi}$; $d_3$ and $H_O$.

Once the parameters $d_3$ and $H_O$ are determined, the positions of dynamic and static primary seals 92 and 108 are determined at the dynamic and static interface 62 and 64. The same process is repeated to locate the dynamic and static secondary seals 94 and 110 with the same or a different criteria for the transfer of dynamic extrusion gap growth to the static interface 64. At this time the variable $d_3$ is a known quantity, the distance $H_i$ is the distance between the two dynamic secondary seals 94, and the dimension to establish $H_O$ is the distance between the two static secondary seals 100.

The design basis establishes that the primary static seals 108 have to be associated with the primary dynamic seals 92 in order to provide the proper control over the dynamic extrusion gap width 66. In the same way, the secondary static seals 110 also have to be associated with secondary dynamic seals 94.

The sizing of the external toroidal cavity 22 is related to the fluid flow requirement as indicated for the internal cavity 20. The external cavity 22 should have at least the same cross sectional area as the internal cavity 20, which has a known cross sectional area A. The shape is preferably rectangular with appropriate radiuses, and the height is limited to be within the upper an lower static seals arrangements 64. The depth of cavity 22 has to be determined.

The upper and lower bearing plates 46, 48 are bolted to the middle housing ring 17 with a tight pilot diameter on the bearing plates 46, 48 to ensure the concentricity with the middle housing ring 17. When the middle housing ring 17 is forced inward to follow the inner housing 16, the bearing plates 46, 48 act like radial stiffeners due to their geometry and restrain the middle housing ring 17 to move inwardly. A radial reaction force develops at the upper and lower pilot diameter and generates a bowing moment all around the middle housing ring 17 at its horizontal line of symmetry. The effect of the bearing plates 46, 48 on the deformation pattern restricts the normal deformation of the middle housing ring 17 and tends to rotate the bearing surfaces 56, 59 out of alignment with the inner housing faces.

To alleviate this problem, the pressure acting vertically on the horizontal faces of the cavity 22 have to provide a counter moment on the middle housing ring 17 to overcome the bowing moment generated by the reaction of the bearing plates 46, 48 in order to restore the middle housing ring 17 deformation pattern with the bearing surfaces 56, 59 mating properly.

Considering the middle housing ring 17 section as a free body diagram with a cutting plane at the horizontal line of symmetry, the loads applied are: a pressure line is applied on the middle housing ring 17 inner diameter from the horizontal line of symmetry up to the primary dynamic seal 90 ($H_i$); a pressure line is applied on the middle housing ring 17 outer diameter from the horizontal line of symmetry up to the primary static seal 108 ($H_O$) (this pressure line includes the cavity diameter $d_3$ and cavity horizontal face); and the reaction force at the bearing plate 46 and middle housing ring 17 connection.

The radial reaction force is estimated as a function of the bearing plates geometry 46 and the required radial displacement to meet the desired deformation of the middle housing ring 17. Knowing the radial reaction force magnitude, the line of action and location, the pressure applied on the middle housing ring 17 surfaces and assuming a symmetrical boundary connection at the free body diagram horizontal line of symmetry, the deformation caused by each type of load is determined at the bearing plate 46 and middle housing ring 17 connection, and the depth of the cavity $d_3$ is determined to achieve the required geometrical compatibility.

The approach outlined above provides only an initial solution, because discontinuities in parts such as pipe spool bores 50 for the inner housing 16 and flow passages 24 for the middle housing rings were not accounted for. Proceeding with finite element analysis tool refines and optimizes the solution for component deformation.

The sizing of the outer housing ring 12 is based on a thick wall cylinder subjected to internal pressure. The thickness is determined by the allowable stresses permitted by the appropriate regulation codes for pressure vessels or by the maximum radial deformation creating the maximum extrusion gap 67 that the static seals 65 can tolerate. The more stringent requirement governs the thickness or diameter $d_4$ of the outer housing ring 12 (see FIG. 3.)

The bearing plates 46, 48 support and capture but do not axially squeeze the outer housing ring 12. The outer housing ring 12 is free to expend radially when pressure is present at the static interface 64. A set of timing or indexing pins 68, which are spaced equally around the top and bottom faces 70, 71 of the outer housing ring 12 are trapped by outer slots 72 machined on the upper and the lower bearing plates 46, 48. In this configuration, the pins 68 prevent the outer housing ring 12 from rotating with respect to the bearing plates 46, 48 and the middle housing 17 as the pins 68 react the pipe loads imparted at the outer housing outlet 74. The pins 68 also insure that the outer housing ring 12 expands concentrically in respect with the middle housing ring 17, because they restrain the outer housing 12 to move radially with respect to the bearing plates 46, 48 and the middle housing ring 17. Accordingly, the outer housing ring 12 is free to expend radially as a function of product fluid pressure, yet the static seals 102 and 104 are capable of such expansion.

Figure 4C:
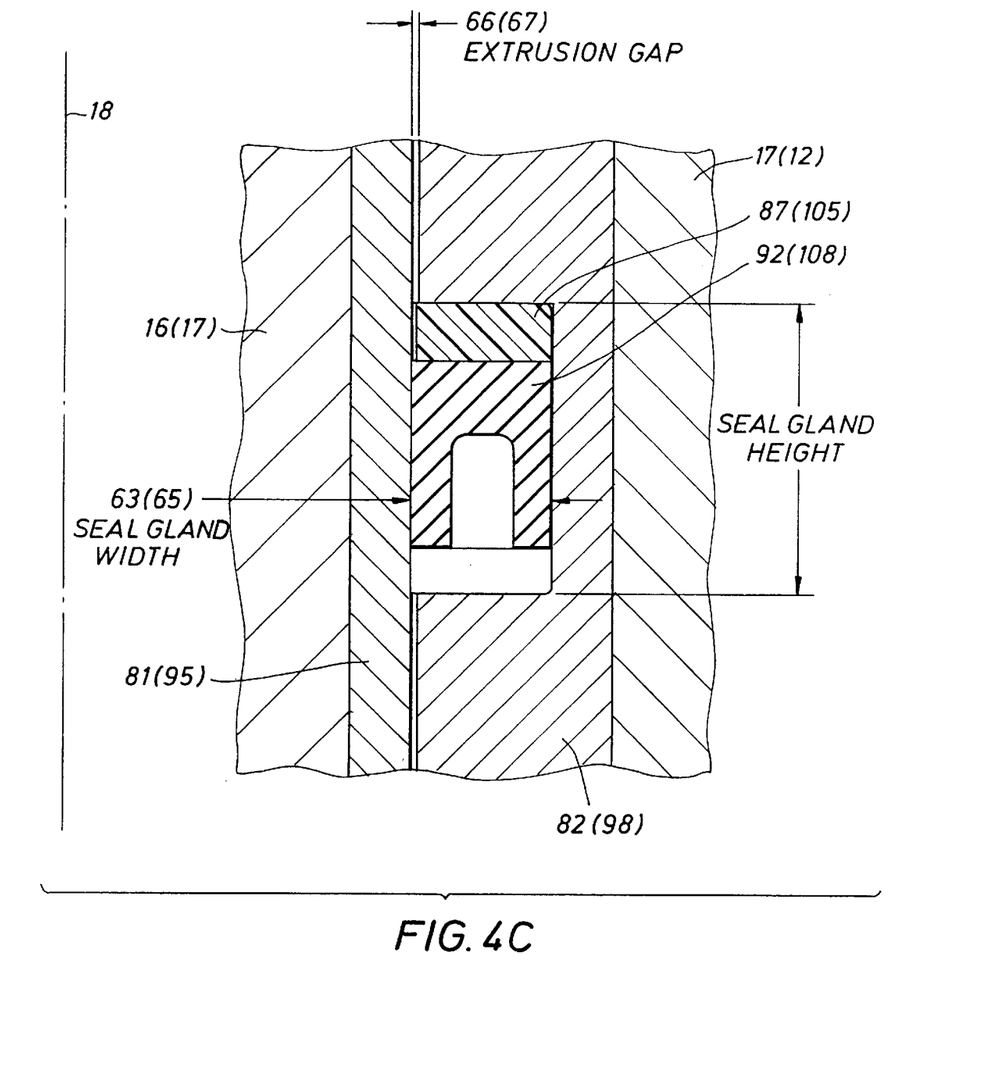
FIG. 4C is an enlarged view of a dynamic seal with an illustration of the extrusion gap.

The preferred dynamic and static seals 88, 90, 92, 94, 106, 108 and 110 are radial type, spring energized seals with anti-extrusion back up rings 87 and 105 as shown in FIGS. 4A, 4B, 4C. The seal material is a reinforced TFE. The energizing spring and the anti-extrusion back up rings 87 and 105 are made of a non-corrosive metallic material. INCONEL is preferred. The dynamic seals 88, 90, 92 and 94 for one design, for example, have a nominal diameter (for a preferred design) of 78 inches while the static seals 106, 108 and 110 have a nominal diameter of 92 inches.

FIG. 4C shows a typical enlargement of a dynamic seal gland 63 as found at the dynamic seal arrangement 62. A static seal gland 65 as found at the static seal arrangement 64 shares the same typical characteristics as a dynamic seal gland 63 except for the size of the seal extrusion gaps 66 (dynamic) and 67 (static). The preferred design provides INCONEL overlaid pockets 82 and 98 for both dynamic and static seal glands 63 and 65 as well as for the corresponding faces 81 and 95 while the inner housing 16, the middle housing ring 17 and the outer housing ring 12 are fabricated of quenched and tempered carbon steel alloys. Of course, other non-corrosive materials can be used for the seal overlaid pockets and other alloy materials can be used for the housings.

Turning again to FIGS. 1 and 2, torque arms 120 are secured to the top and bottom bearing plates 46, 48 by threaded bolts 122, and studs 51 and nuts 61. A torque bar 123 connects the torque arms 120. The torque bar 123 can be connected to a structure on a vessel so that turning of the vessel causes the upper and lower bearing plates 46, 48, the middle housing ring 17 and the outer housing ring 12 to turn simultaneously with the vessel about the substantially stationary inner housing 16. The radial load generated at the torque bar 123 is transmitted to both top and bottom torque arms 120 connected to upper and lower bearing plates 46, 48. The radial loads react against the inner housing 16 at the radial bearing interface 56 between the inner housing 16 and the upper and lower bearing plates 46 and 48, ensuring coaxiality. The outer housing ring 12 is being "carried" by the upper and lower bearing plates 46, 48, and the pins 68 between those members reacts any side loads like external pipe loads at the outer housing outlet 74 on the outer housing ring 12. The pins 68 insure that the outer housing ring 12 expands concentrically and stays coaxial with respect to the middle housing ring 17.

The swivels 10A, 10B of the stacked swivel arrangement of FIG. 1 are arranged so that access to dynamic and static seals can be obtained without unstacking the swivels. This is accomplished because the outer diameter $d_s$ of the stacking connector 52 is less than the inner diameter $d_b$ of the top and bottom bearing plates. As a result, if a bottom or top dynamic or static seal were to fail and require replacement, then the studs 51 can be removed such that the bearing plate (plate 48 for example) can be lowered (or raised, as the case may be) a sufficient distance so that access to the seals and seal glands may be obtained for replacement of the seals or repair of the bearing surfaces. This is accomplished by using temporary hydraulic lifting equipment and embedded lifting points (not illustrated) on the swivel itself. The operation doesn't require an overhead crane or lifting points other than the swivel to be serviced.

Alternative embodiments of the invention are illustrated in FIGS. 5–8, with each high pressure fluid swivel joint including an inner housing 16, and a middle or "isolator" housing ring 17, and an outer housing ring 12. An inlet 26 in the inner housing 16 leads to an inner annular cavity 20 between the inner and the middle housing rings 16, 17. The inner annular cavity 20 is defined between the inner 16 and middle 17 housings. An outer annular cavity 22 is defined between the middle 17 and outer 12 housings. A bearing 200 is mounted on the inner housing ring 16 and is arranged and designed to rotatably couple the inner housing 16 with the middle housing ring 17 so that the middle housing ring 17 and the outer housing ring 12 which is mounted to the middle housing 17 can rotate with respect to the inner housing.

Holes or flow passages 24 provide communication between an inner annular cavity 20 and an outer annular cavity 22. Pressurized fluid product flows through the inlet 26 to the inner annulus 20 through the flow passages 24 to the outer annular cavity 22 and out an outlet 28.

Figure 5:
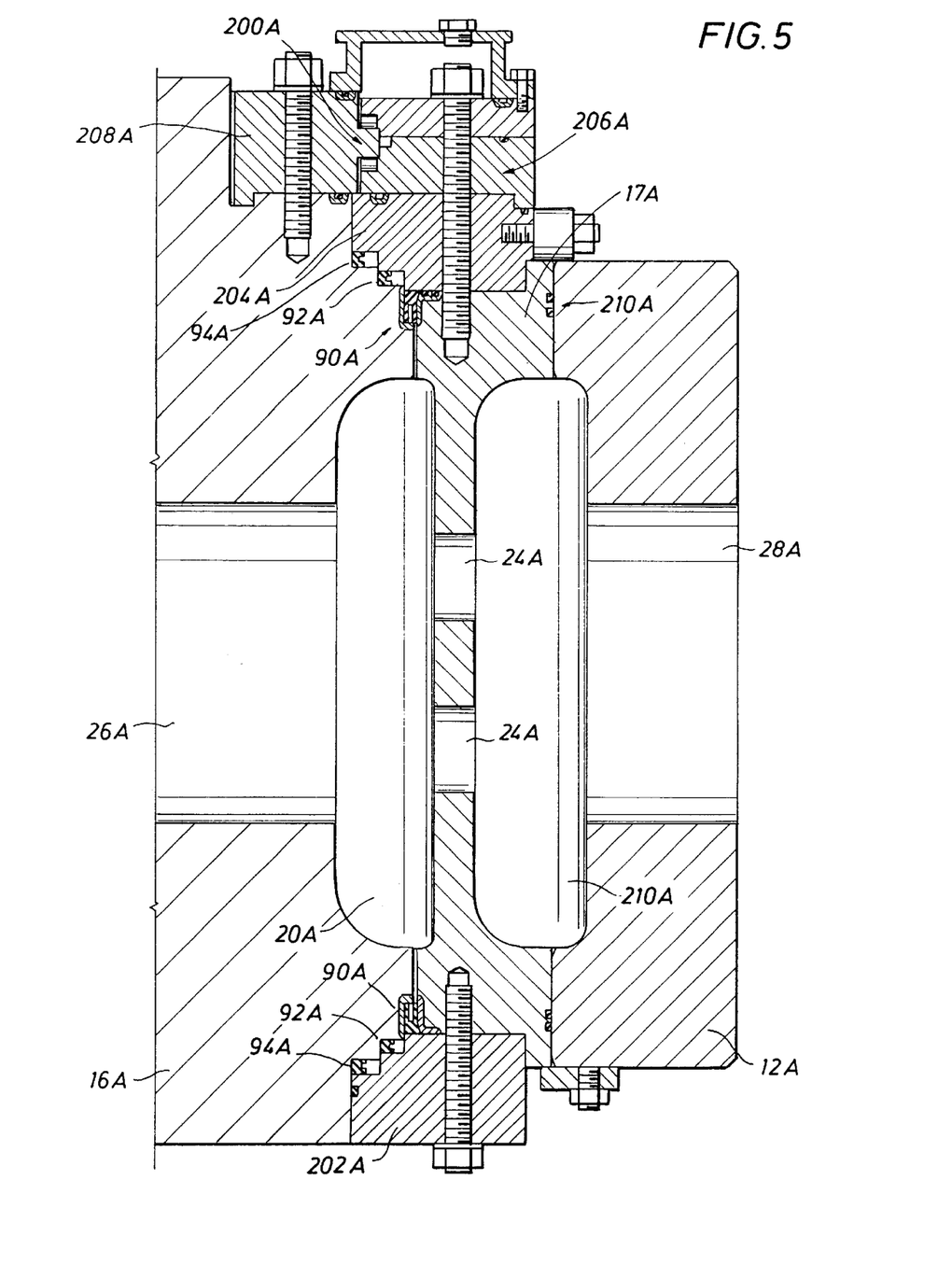
FIGS. 5–8 show alternative arrangements of a swivel according to the invention with each swivel including an inner housing, a middle housing ring and an outer housing ring.
Figure 7:
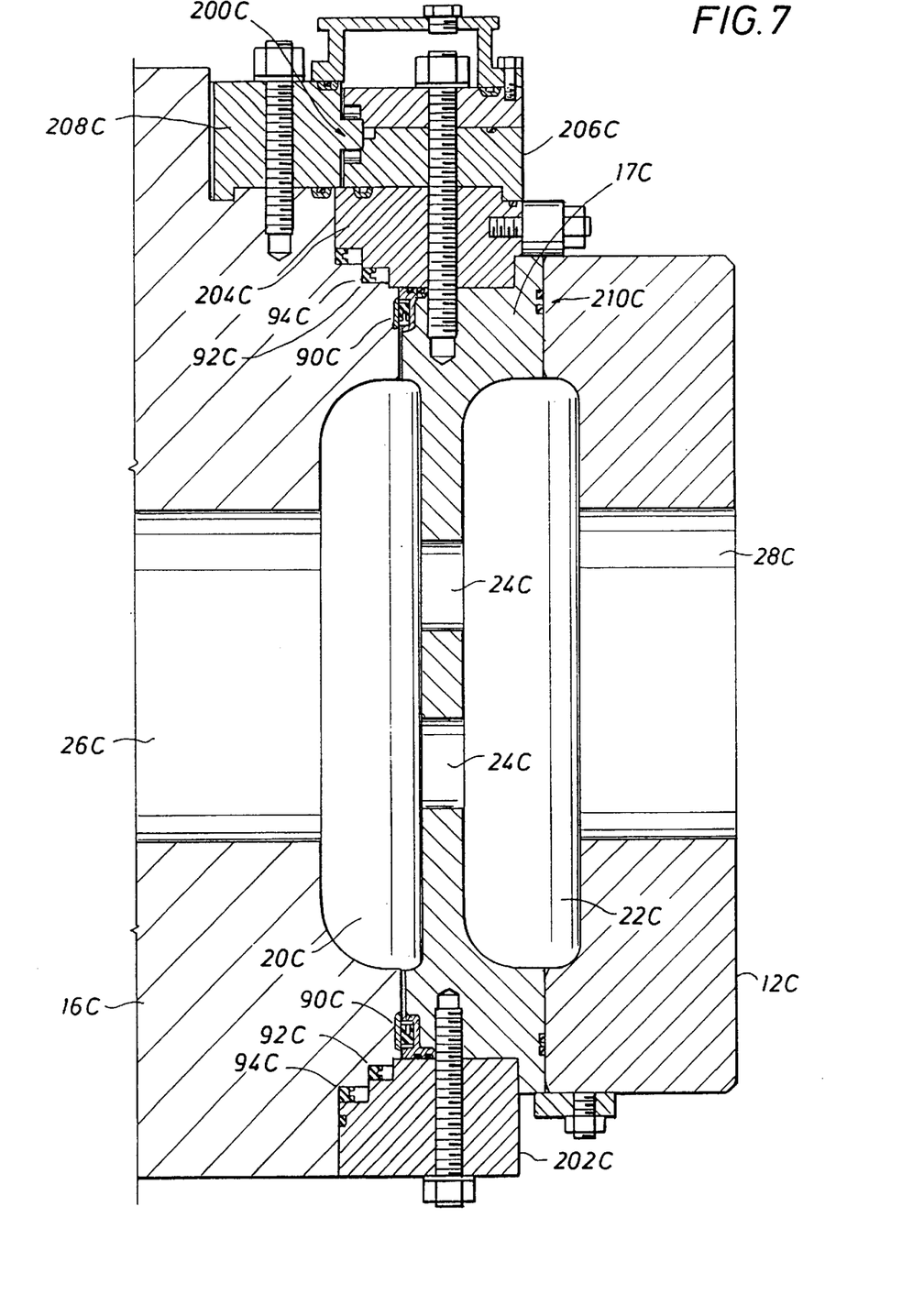

In the embodiment of FIG. 5, the swivel parts are labeled as referenced above, but include the letter A to designate the specific arrangement illustrated in FIG. 5. The dynamic seals, in the form of face seals 92A, 94A are placed in radially oriented dynamic seal grooves which face longitudinally between outer surfaces of upper seal plate 204A mounted to the middle housing ring 17. In the examples of FIG. 5 and 7, where a three row roller bearing 200 is provided, a lower seal plate 202 is mounted to the middle housing 17A, but an upper seal plate 204 is sandwiched below an outer bearing ring block 206 of the three row roller bearing. The static race inner bearing ring block 208A, 208C of the three row roller bearing 200 is secured to the inner housing in the embodiments of FIGS. 5 and 7. Static seals 210A, 210C are placed in radial grooves at the interface between mating surfaces of the middle 17A, 17C and outer 12A, 12C housing rings. The difference between the arrangements of FIGS. 5 and 7 is in the placement of the grease barrier seals. In FIG. 5 the grease barrier seal 90A is in a groove of the inner housing 16A. In FIG. 7, the grease barrier 90C is in a groove in the middle housing ring 17C.

Figure 6:
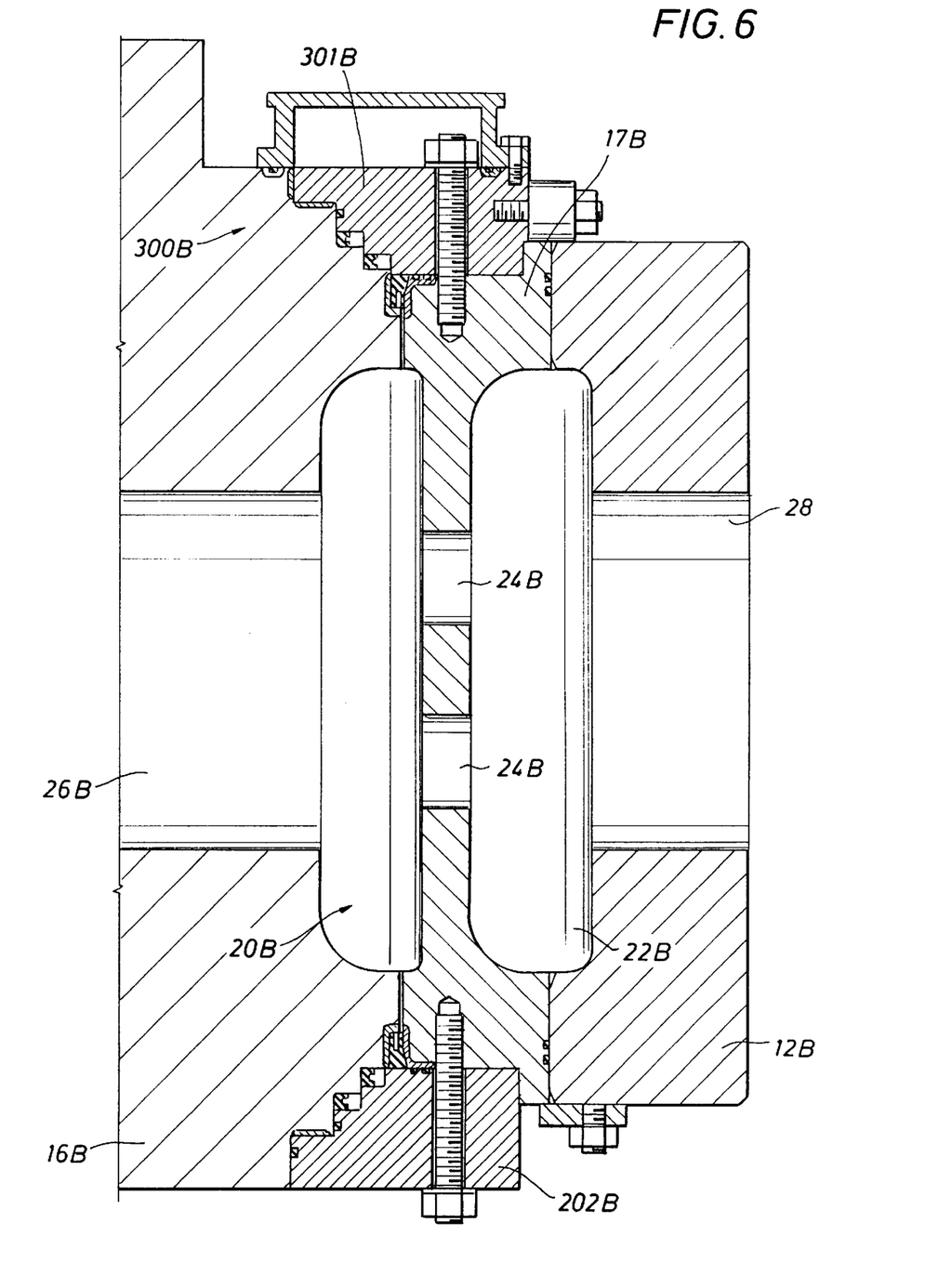
Figure 8:
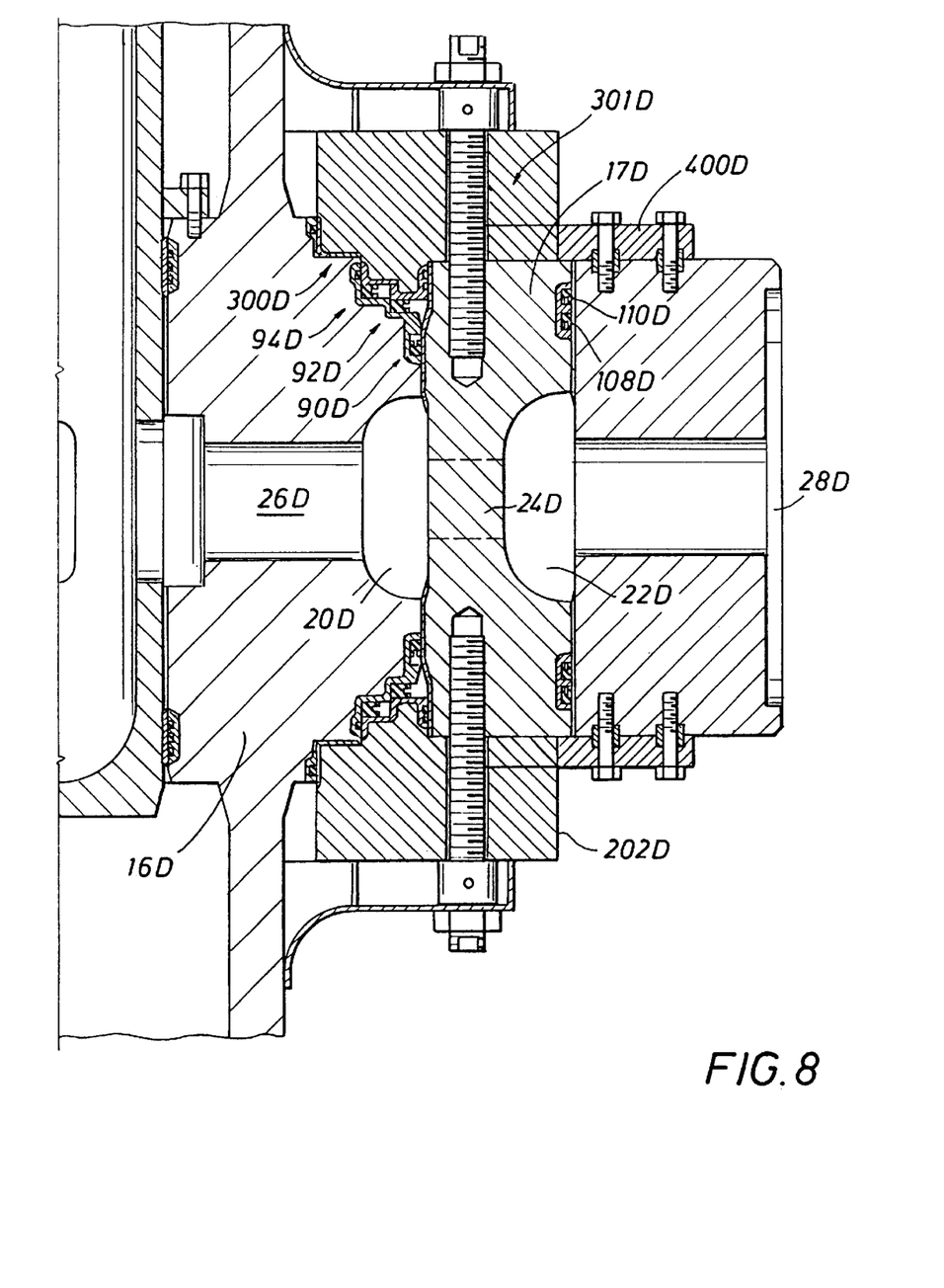

In the embodiments of FIGS. 6 and 8, a sliding surface bearing 300 rotatably couples the middle housing ring 17 to the inner housing 16. As illustrated in FIG. 8, the sliding surfaces of the bearing are a bronze coating on the bearing ring 301D and steel on the opposite ring of the inner housing 16. A cover is placed on top of the bearing in order to prevent grit from entering the bearing.

In the embodiment of FIG. 8, face seals 92D, 94D are employed as the dynamic seals between the lower faces of seal plate 301D and the inner housing ring 16D. Radial seals 108D, 110D are used in the radial grooves of the middle housing ring 17D for the static seals between the outer housing 12D and the middle housing 17D. Such seals are called "static" because the outer housing ring 12D and middle housing ring 17D do not rotate with respect to each other. Because they are secured together by keys 400D which are secured to the middle housing ring 17D, the middle housing ring 17D and the outer housing ring 12D rotate with each other yet can expand radially with respect to each other under the force generated by increasing product pressure in the cavities 20D, 22D.

The middle housing ring 17 in all of the embodiments of the invention acts as a pressure isolator unit in the product swivel, because it transfers extrusion gap growth from the dynamic interface to the static interface. It has holes or slots or passageways 24 between the inner annular cavity 20 and the outer annular cavity 22. As a result, the forces caused by high pressure act both inwardly and outwardly in the radial direction on the middle housing ring 17. The upper seal plate 301, the lower seal plate 202 and the bearing 200 are secured, as by bolts, to the middle housing 17, thereby isolating them from radial movement caused by high pressure in the swivel. The bearing (200 or 301 and 202) provides rotation of the middle 17 and outer 12 housings around the inner housing 16 as the vessel weathervanes about the inner housing 16.

The primary and secondary dynamic seals 92, 94 prevent high pressure fluid from escaping through the seal extrusion gap between the housings. The seals can be placed in grooves on either the inner housing 16 or the middle housing ring 17. The inner housing 16 is arranged and designed to have a very heavy wall thickness; as a result, the inner housing limits contraction in a radial direction as a result of high pressure in the inner annulus 20. The middle housing is arranged and designed, by the pressure balancing feature of the inner annulus 20 and outer annulus 22, to track inward displacement of the inner housing 16 with increasing product pressure. As a result, very little (or substantially zero) change in seal extrusion gaps occurs with change in internal swivel pressure.

As explained above, static seals 108, 110 are placed between the middle housing ring 17 and the outer housing ring 12. Such static seals retain pressurized fluid between the two housings 12, 17, but as the outer housing 12 expands radially in response to high pressure in the outer annulus 22, radial displacement on the outer housing is not transmitted to the middle housing. Accordingly, the seals between the middle housing ring and the outer housing ring are static and act to retain high pressure between the two housings with a substantially larger extrusion gap without failure, than the dynamic seals between the middle housing and the internal housing can tolerate.

Although the invention has been described above by reference to preferred embodiments, it should be understood that modifications to those embodiments may be within the scope of the invention as defined by the claims which follow.

What is claimed is:

1. A sealed fluid joint comprising:
   an inner housing,
   outer and middle housing rings positioned coaxially about said inner housing, with said outer and middle housing rings arranged and designed to rotate together relative to said inner housing about a common central longitudinal axis,
   an inner annular fluid manifold defined between said inner housing and said middle housing ring,
   an outer annular fluid manifold defined between said middle and outer housing rings,
   a passage formed in said middle housing ring between said inner and outer annular fluid manifolds which allows communication of pressurized fluid between said inner and outer manifolds,
   upper and lower outer annular ring-shaped seal glands defined between said middle and outer housing rings,
   upper and lower outer annular seals positioned respectively in said upper and lower outer seal glands,
   upper and lower inner annular ring-shaped seal glands defined between said middle housing ring and said inner housing,
   upper and lower inner annular seals positioned respectively in said upper and lower inner seal glands,
   said middle housing ring and said inner housing and said outer housing ring and said seals in said seal glands being arranged and designed to maintain said upper and lower inner annular shaped seal glands at a predetermined extrusion gap width as a function of pressure of said pressurized fluid in said inner and outer annular fluid manifolds.

2. The sealed fluid joint of claim 1 wherein
   said upper and lower inner annular seals which are positioned respectively in said upper and lower inner seal glands function as dynamic seals, with said upper and lower inner annular seals sealing against opposing surfaces of said middle housing ring and said inner housing with upper and lower extrusion gaps defined above and below said upper and lower seal glands, and wherein
   said upper and lower extrusion gaps are maintained at an approximately constant extrusion gap width as a function of pressure of said pressurized fluid in said inner and outer annular fluid manifolds.

3. The sealed fluid joint of claim 1 wherein
   said outer and middle housing rings are arranged and designed to separate radially as a function of pressure of said pressurized fluid in said outer annular fluid manifold, thereby increasing outer extrusion gap width with increasing pressure in said outer fluid manifold.

4. The sealed fluid joint of claim 3 wherein
   said upper and lower inner annular seals which are positioned respectively in said upper and lower inner seal glands function as dynamic seals, with said upper and lower inner annular seals sealing against opposing surfaces of said middle housing ring and said outer housing with upper and lower extrusion gaps defined above and below said upper and lower seal glands, and wherein said upper and lower extrusion gaps are maintained at an approximately constant extrusion gap width as a function of pressure of said pressurized fluid in said inner and outer annular fluid manifolds.

5. The sealed fluid joint of claim 1 further comprising, upper and lower structures positioned respectively adjacent upper and lower surfaces of said middle and inner housings including a rotative support arrangement between said inner housing and said middle housing ring.

6. The sealed fluid joint of claim 5 wherein said upper and lower structures are secured to said middle housing ring by top and bottom fasteners.

7. The sealed fluid joint of claim 5 wherein said upper and lower structures positioned respectively adjacent upper and lower surfaces of said middle and said inner housings capture and support said outer housing ring around said middle housing ring without clamping said outer housing ring between said upper and lower structures.

8. The sealed fluid joint of claim 6 wherein said rotative support arrangement between said inner housing and said middle housing ring includes axial and radial planar bearing surfaces.

9. The sealed fluid joint of claim 6 wherein said rotative support arrangement between said inner housing and said middle housing ring includes axial and radial roller bearings.

10. The sealed fluid joint of claim 1 wherein said upper and lower inner annular ring-shaped seal glands are formed by surfaces of said middle housing ring and said inner housing which are parallel to said central longitudinal axis, and said upper and lower annular seals which are positioned respectively in said upper and lower annular ring-shaped clearance gaps are radial seals.

11. The sealed fluid joint of claim 5 wherein said upper and lower annular inner annular ring-shaped seal glands are formed by surfaces of said inner housing and said upper and lower structures which are radially oriented with respect to said central longitudinal axis, and said upper and lower annular seals which are positioned respectively in said upper and lower annular ring-shaped seal glands are face seals.

12. The sealed fluid joint of claim 1 further comprising upper and lower structures positioned adjacent upper and lower surfaces of said middle housing ring and overlapping respective upper and lower surfaces of said outer housing ring, top and bottom fasteners which respectively secure said upper and lower structures to said middle housing, and coupling means disposed respectively between said outer housing ring and said upper and lower structures for preventing relative rotation between said middle housing ring and said outer housing ring while allowing relative radial expansion between said middle housing ring and said outer housing ring under the influence of pressurized fluid in said inner and outer annular fluid manifolds.

13. The sealed fluid joint of claim 12 wherein said coupling means comprises top and bottom axial pins secured in said outer housing rings with heads extending above said respective upper and lower outer housing rings, and open slots which are radially oblong with respect to said common longitudinal axis in said upper and lower structures, said open slots respectively positioned to correspond to positions of said heads, with said heads positioned in said open slots with freedom to move radially with respect to said common longitudinal axis in said open slots whereby rotational motion of said outer housing ring with respect to said middle housing ring is retrained by said heads positioned in said open slots.

14. The sealed fluid joint of claim 12 wherein said coupling means is further for maintaining said outer housing ring substantially concentric with said middle housing ring when external side loads are applied to said outer housing ring.

15. The sealed fluid joint of claim 1 wherein said upper and lower inner extrusion gaps are maintained at an approximately constant gap width with increasing product fluid in said joint solely as a result of the pressure of said pressurized fluid in said joint.

16. A sealed fluid joint comprising:

an inner cylindrical housing having an inlet passage, an outer housing ring having an outlet passage, a middle housing ring disposed between said inner and outer housings, said outer housing ring and said middle housing rings being coaxially positioned around said inner cylindrical housing, an inner annular fluid cavity defined between said inner housing and said middle housing ring, said inner cavity in fluid communication with said inlet passage, upper and lower inner seal glands defined between upper and lower surfaces of said inner housing and said middle housing ring, said upper and lower inner seal glands being in fluid communication with said inner annular fluid cavity, an outer annular fluid cavity defined between said outer housing ring and said middle housing ring, said outer cavity being in fluid communication with said inner annular fluid cavity and with said outlet passage, upper and lower outer seal glands defined between upper and lower surfaces of said outer housing ring and said middle housing ring, said upper and lower outer seal glands being in fluid communication with said outer annular fluid manifold, upper and lower dynamic seals positioned in said upper and lower inner seal glands, upper and lower static seals positioned in said upper and lower outer seal glands, and means for coupling said outer housing ring and said middle housing ring so that said outer and middle housing rings are capable of rotating together about said inner cylindrical housing, with said outer and middle housing being free to deflect radially with respect to each other as a function of fluid pressure in said inner and outer annular fluid manifolds.

17. The sealed fluid joint of claim 16 wherein, upper and lower inner extrusion gaps are defined above and below said dynamic seals; and said inner and outer annular fluid cavities and said dynamic and static seals in said respective inner and outer seal glands are arranged and designed to maintain a substantially constant width of said upper and lower inner seal extrusion gaps as a function of fluid pressure in said inner and outer annular fluid manifolds.

18. The sealed fluid joint of claim 17 wherein, maintenance of said substantially constant width of said upper and lower inner seal extrusion gaps is achieved by the activation of the pressure of said pressurized fluid internal in said joint and without external pressurized barrier fluid.

19. The sealed fluid joint of claim 16 wherein, a plurality of passages through said middle housing ring provides fluid communication between said inner and outer annular fluid cavities.

20. The sealed fluid joint of claim 16 wherein, fluid pressure in said inner annular fluid cavity causes said inner housing to deflect radially inwardly as a function of magnitude of said fluid pressure, said inner annular fluid cavity and said upper and lower dynamic seals positioned in said upper and lower inner seal glands are arranged and designed to exert a radially outwardly force on said middle housing ring as a function of magnitude of said fluid pressure, and said outer annular fluid cavity and said upper and lower static seals positioned in said upper and lower seal glands are arranged and designed to exert a radially inwardly force on said middle housing ring as a function of magnitude of said fluid pressure to overcome said radially outwardly force and cause said middle housing ring to deflect radially inwardly substantially identically to radially inwardly deflection of said inner housing as a function of magnitude of said fluid pressure.

21. A high pressure production swivel assembly comprising, a fixed swivel stack base having a base inlet for securement to a fixed spool, said swivel stack base having a base bore disposed therein which communicates with said base inlet, an inner housing fixedly coupled to said swivel stack base and having an inner housing inlet, said inner housing having a bore disposed therein which communicates with said inner housing inlet, a floating spool having one end positioned in said housing bore and a second end positioned in said base bore, said spool having an inner housing hole and a stack base hole, said inner housing hole being in fluid communication with said housing inlet, said stack base hole being in fluid communication with said base inlet, upper and lower inner housing seals disposed between walls of said one end of said floating spool and walls of said housing bore and positioned respectively above and below said housing inlet, upper and lower stack base seals disposed between walls of said second end of said floating spool and walls of said swivel stack base and positioned respectively above and below said base inlet, and at least one rotatable outer housing ring mounted for rotation with respect to said inner housing and including an annular manifold therein in fluid communication with an outlet passage of said rotatable outer housing ring.

22. The high pressure production swivel of claim 21 including, a middle housing ring disposed between said inner housing and said at least one rotatable outer housing ring, an inner annular fluid manifold defined between said inner housing and said middle housing ring and in fluid communication with said inner housing inlet, upper and lower first seal glands defined between upper and lower surfaces of said inner housing and said middle housing ring, said upper and lower seal glands being in fluid communication with said inner annular fluid manifold, an outer annular fluid manifold defined between said outer housing ring and said middle housing ring and being in fluid communication with said inner annular fluid manifold and with said outlet passage, upper and lower second seal glands defined between upper and lower surfaces of said outer housing ring and said middle housing ring, said upper and lower seal glands being in fluid communication with said outer annular fluid manifold, upper and lower dynamic seals positioned in said upper and lower first seal gaps, upper and lower static seals positioned in said upper and lower second seal gaps, and means for coupling said outer housing ring and said middle housing ring so that said outer and middle housing rings rotate together about said inner cylindrical housing, with said outer and middle housings being free to deflect radially with respect to each other as a function of fluid pressure in said inner and outer annular fluid manifolds.

23. The high pressure production swivel of claim 22 wherein, said inner and outer annular fluid manifolds and said seals in said seal glands are arranged and designed to maintain a substantially constant width of extrusion gaps above and below said upper and lower first seal gaps as a function of fluid pressure in said inner and outer annular fluid manifolds.

24. The high pressure production swivel of claim 21 including, a middle housing ring disposed between said inner housing and said at least one rotatable outer housing ring, an inner annular fluid manifold defined between said inner housing and said middle housing ring and in fluid communication with said inner housing inlet, upper and lower first seal glands defined between upper and lower surfaces of said inner housing and said middle housing ring, said upper and lower seal glands being in fluid communication with said inner annular fluid manifold, an outer annular fluid manifold defined between said outer housing ring and said middle housing ring and being in fluid communication with said inner annular fluid manifold and with said outlet passage, upper and lower second seal glands defined between upper and lower surfaces of said outer housing ring and said middle housing ring, said upper and lower seal gaps being in fluid communication with said outer annular fluid manifold, upper and lower dynamic seals positioned in said upper and lower first seal gaps, upper and lower static seals positioned in said upper and lower second seal gaps, and wherein, said inner and outer annular fluid manifolds and said seals in said clearance gaps are arranged and designed to maintain a substantially constant width of said upper and lower first seal gaps as a function of fluid pressure in said inner and outer annular fluid manifolds.

* * * * *